Sept. 2, 1958 J. F. KOPCZYNSKI 2,850,338
HIGH SPEED BEARING
Filed Dec. 6, 1955 2 Sheets—Sheet 1
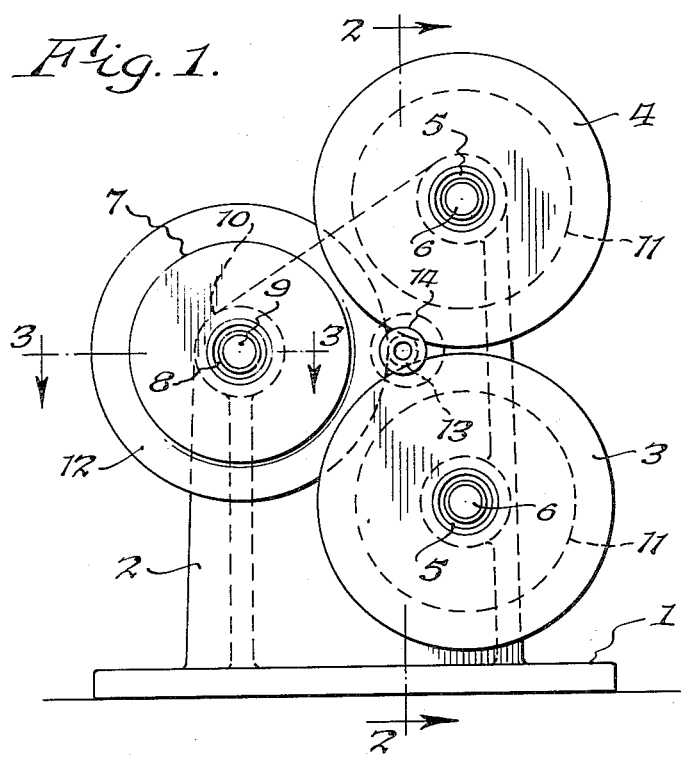
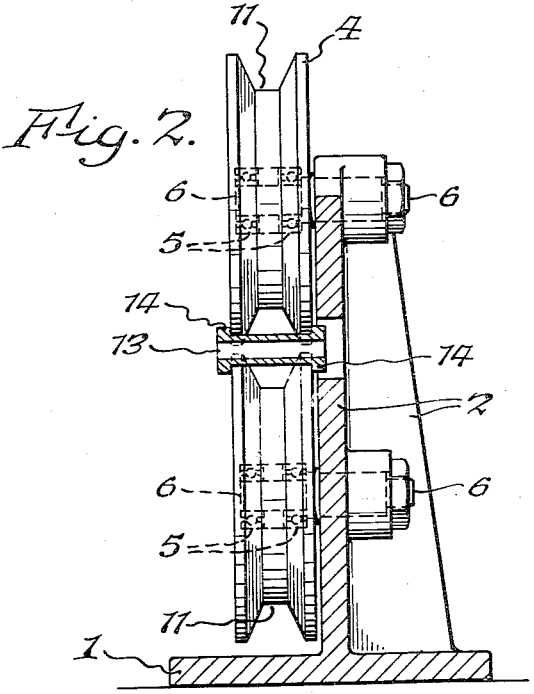
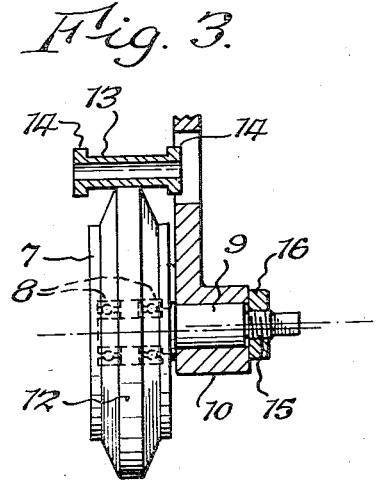
INVENTOR.
John F. Kopczynski
BY
Parker, Parchman, Verna
Attorneys.

Sept. 2, 1958     J. F. KOPCZYNSKI     2,850,338
HIGH SPEED BEARING
Filed Dec. 6, 1955                            2 Sheets—Sheet 2
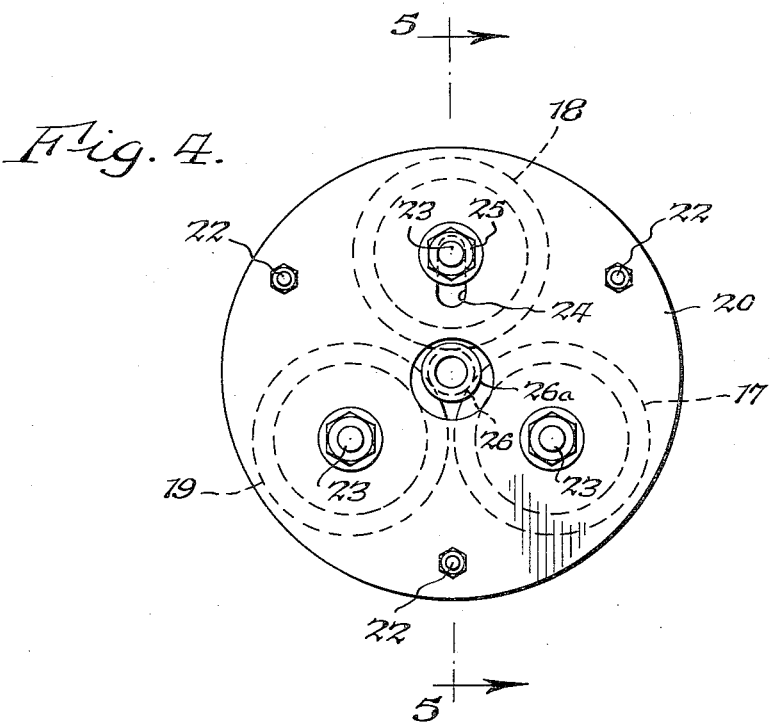
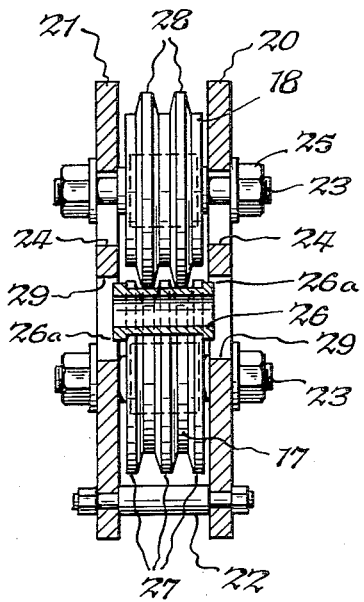
INVENTOR.
John F. Kopczynski
BY
Carter, Cushman Varner
Attorneys.

United States Patent Office 2,850,338
Patented Sept. 2, 1958

2,850,338

HIGH SPEED BEARING

John F. Kopczynski, North Tonawanda, N. Y.

Application December 6, 1955, Serial No. 551,377

4 Claims. (Cl. 308—203)

This invention relates to bearings, and particularly to those which may operate at relatively high speeds without undue heating of bearings. Devices of this type are particularly useful in mounting relatively small diameter objects for high speed rotation while work is performed on such objects, or to rotate a machine tool, such as a grinding wheel, at a relatively high rate of rotation while it performs a machining operation on some other object.

An object of this invention is to provide a high speed bearing which will mount and successfully rotate an object or tool at very high rates of rotation without undue heating; which may be adjusted to accommodate objects or tools having different diameters, and which will be relatively simple, practical, effective and inexpensive.

Other objects and advantages will be apparent from the following description of some embodiments of the invention, and the novel features will be pointed out hereinafter in the appended claims.

In the accompanying drawings:

Fig. 1 is a face elevation of a simple, high speed bearing constructed in accordance with this invention;

Fig. 2 is a vertical, sectional elevation of the same, with the section taken approximately along the line 2—2 of Fig. 1;

Fig. 3 is a sectional plan of a portion of the same, the section being taken approximately along the line 3—3 of Fig. 1;

Fig. 4 is a face elevation of a modification of the bearing; and,

Fig. 5 is a sectional elevation of the same, with the section taken approximately along the line 5—5 of Fig. 4.

In the embodiment of the invention illustrated in Figs. 1 to 3, the base 1 is provided with an upstanding pedestal 2, and wheels 3 and 4 of preferably the same size are accurately and rotatably supported in suitable bearings 5 that are provided on studs 6 that extend from the pedestal 2. Preferably, low friction bearings 5 are provided for the wheels 3 and 4, such as ball or roller bearings. A third wheel 7 is rotatably mounted by a low friction bearing 8 on an eccentric stud 9, which is rotatable in a boss 10 provided also on the pedestal 2 at one side of the wheels 3 and 4. The wheels 3 and 4 have peripherally extending grooves 11 which are alined with each other, and the wheel 7 is provided with a rib-like periphery 12 that has a substantial length in a direction parallel to the axis of rotation of that wheel, which length is however less than the width of the peripheral grooves 11 of the wheels 3 and 4, so that the rib 12 can enter the grooves 11. The periphery 12 of the wheel 7 may thus enter the peripheral grooves 11 of the wheels 3 and 4 to a substantial extent, so that the three wheels may move into very close triangular relation to each other and engage between them an object 13, which preferably has peripheral, exterior flanges 14 at its opposite ends that engage against the outside faces of one or both of the wheels 3 and 4. This object 13 may thus be held by the flanges 14 against endwise movement while supported in the triangle between the three wheels, and also mounted for rotation with the wheels. The eccentric stud 9, which is rotatable in the boss 10 of the pedestal, is provided with a threaded end 15 that carries a lock nut 16 which abuts against the end face of the boss 10, and thus locks the eccentric stud 9 against unintentional rotation in its boss 10. By adjusting the eccentric stud through rotation in its boss, the third wheel 7, which is eccentrically mounted on the stud, may be adjusted toward or away from the two wheels 3 and 4, so as to increase or decrease the pressure exerted by all of the three wheels 3, 4 and 7 on the rotatable object 13. The object 13 may be any desired object, but is preferably a sleeve through the passage of which a shaft (not shown) may be fitted snugly without appreciable clearance. Any means may be employed to mount the shaft, such as by a press fit or by an accurate, concentric chuck type of device. The shaft as received in the object or sleeve 13 is rotatably mounted so as to be free to rotate at very high speeds.

It will be observed that since the wheels 3, 4 and 7 will have diameters which are relatively large in comparison to the diameter of the object 13, the linear speed of the peripheries of the wheels 3, 4 and 7 will be the same as the linear speed of the periphery of the object 13, but the object 13 will be given a rate of rotation many times higher than the rotation of any of the wheels 3, 4 and 7, so that each wheel 3, 4 or 7 will make only a relatively small number of rotations for a relatively large number of revolutions of the object 13. There will be little or no friction between the object 13 and the wheels 3, 4 and 7 because this is a rolling friction, and hence there will be little heat developed in the object 13 as it is rotated at a high speed. Since the wheels, 3, 4 and 7 operate at a relatively low number of revolutions per unit of time, their peripheral speed on their own individual bearings is low, which will avoid overheating of those bearings.

In Figs. 4 and 5 there is a similar triangular arrangement of three wheels 17, 18 and 19 which are disposed between two plates 20 and 21 that are spaced apart and held by spacing studs 22. Each of these wheels is rotatably mounted on a bearing rod 23, and one of these wheels, such as the wheel 18, has its bearing rod 23 slidable in elongated slots 24 of the plates 20 and 21. The slots 24 extend radially of the triangular wheels, so that by loosening the nuts 25 on the bearing stud 23 for the wheel 18, the wheel 18 may be shifted toward and from the other wheels 17 and 19, and thus engage and rotatably mount an object or sleeve 26 with external, peripheral flanges 26a at its ends that engage against the outside faces of at least one of the wheels 17, 18 or 19 and prevent its endwise displacement. The tightening of nuts 25 will hold the wheel 18 in any of its adjusted positions.

In this embodiment of the invention, two of the wheels, such as 17 and 19, may have a periphery with three or more spaced apart lands or ribs 27, and the wheel 18 may have a plurality of peripherally extending ribs 28 which may enter the spaces between the lands 27 as the wheel 18 approaches the wheels 17 and 19. When the wheel 18 has been adjusted to engage the object or sleeve 26 and confine it against the wheels 17 and 19, the nuts 25 are tightened, so as to hold the wheel 18 in that relationship. The action of this modified bearing is the same as explained for Figs. 1 to 3, except that a longer bearing support provided by the three wheels on the object held and rotated thereby is possible. The plates 20 and 21 are, of course provided with alined, central apertures 29 through which the object 26 being mounted and rotated will be accessible, and the object itself may, if desired, extend through these openings or apertures 29 in the plates 20 and 21, or a rod fitted in the sleeve or object 26 may extend through these apertures 29 in either or both directions from the wheels.

It will be understood that various changes in the details and arrangements of parts which have been herein described and illustrated in order to explain the nature of the invention, may be made by those skilled in the art, within the principle and scope of the invention as expressed in the appended claims.

I claim:

1. A bearing for imparting high speeds of rotation to an object comprising a rigid frame, studs spaced apart on said frame and parallel to each other, a wheel rotatably mounted on each stud and having a grooved periphery with the grooves of the two wheels alined side by side with each other, a third wheel, an eccentric stud rotatably carried by said frame with its axis of rotation parallel to the axis of rotation of the two first mentioned wheels, and in turn rotatably mounting said third wheel eccentrically thereon in approximate side by side alinement with the other two wheels, means for releasably securing said eccentric stud in different eccentric relations to said other wheels for securing said three wheels in the desired relation to each other, said third wheel having a ribbed periphery of a size capable of entering the grooves in the other two wheels without contact therewith, a sleeve confined between the three wheels by their peripheries, said sleeve and at least one of said wheels having interengaging parts limiting endwise movement of said sleeve as it rotates, whereby an object passing through and secured snugly in said sleeve, may be safely rotated at a very high speed.

2. A high speed bearing comprising a frame, three parallel studs mounted thereon in side by side, but spaced apart, parallel relation, one of said studs being rotatable in its mounting on said frame about its own longitudinal axis, a wheel rotatably mounted on each of said studs in side by side relation, one of said wheels being rotatably mounted on said rotatable stud eccentrically of the axis of rotation of that stud, means for securing said rotatable stud in any of different angular increments of its rotation on said frame, a sleeve rotatably confined between the peripheries of said wheels and having interengagement with one of said wheels for preventing substantial endwise movement of said sleeve as it rotates, whereby a shaft when extending snugly through said sleeve may safely rotate therewith at a very high angular speed with minimum heating and wear of the bearings of said wheels, two of said wheels having their peripheries telescoping and out of contact with the periphery of the other wheel to enable very close approach of said wheels to engage a sleeve of very small diameter while employing said wheels of relatively large diameter.

3. A high speed bearing comprising a support, a pair of wheels disposed in side by side alinement but spaced slightly apart and rotatably mounted in bearings on said support, a third wheel also disposed in side by side alinement with said pair of wheels, also rotatably carried in a bearing on said support but with its bearing adjustable in a direction toward and from the space between said pair of wheels, means for holding said third wheel in any of its adjusted positions, and an object confined in the triangle between the peripheries of said wheels, by the peripheries of said wheels, and rotatably mounted between the wheels to rotate therewith, all of said wheels having diameters much greater than the diameter of said object, whereby the object will roll on the wheel peripheries at the same linear speed, and the wheels will rotate in their bearings at much lower rates of rotation than the object, said object having external, peripheral flanges at its ends which engage with the opposite faces of one of said wheels to limit endwise movement of the object in a direction parallel to its axis of rotation, said third wheel and the wheels of said pair having peripheries that telescope somewhat with one another without contacting with each other as the third wheel and the pair are brought close together by adjustment of said third wheel, whereby relatively small objects may be rotatably held between the three wheels and solely by said wheels.

4. A high speed bearing comprising a support, a pair of wheels and a third wheel forming a triangle of wheels in side by side alinement and rotatable in bearings carried by said support, but with relative, sidewise movement toward and from one another between said third wheel and said pair, means for holding said wheels against such relative movement in any of their said relative, adjustable positions, and an object rotatably confined in the triangle solely between said wheels by said relative movement of said wheels, all of said wheels having diameters much greater than the diameter of said object, whereby said object will roll on the wheel peripheries at the same surface speeds as the wheel peripheries, and the wheels will rotate in their bearings at much lower surface bearing speeds than the surface rate of movement of said object, said pair of wheels having peripheries that telescope somewhat with the periphery of said third wheel without contacting with said third wheel, as the third wheel and the pair of wheels approach each other by said relative movement, whereby relatively small objects may be rotatably held between said wheels and given very high speeds of rotation with relatively low surface bearing speeds of said wheels.

References Cited in the file of this patent

UNITED STATES PATENTS

| Re. 9,295 | Higley | July 13, 1880 |
| 616,396 | Billberg | Dec. 20, 1898 |
| 782,024 | Heise | Feb. 7, 1905 |
| 1,748,174 | Hirvonen | Feb. 25, 1930 |
| 1,827,968 | Bryant | Oct. 20, 1931 |
| 2,581,593 | Luttenauer | Jan. 8, 1952 |
| 2,676,276 | Parker | Apr. 20, 1954 |

FOREIGN PATENTS

| 7,659 | Sweden | Nov. 27, 1894 |
| 417,813 | France | Sept. 10, 1910 |
| 183,844 | Great Britain | July 28, 1922 |